United States Patent [19]
Koerner

[11] 3,733,760
[45] May 22, 1973

[54] REACTOR VESSEL
[75] Inventor: Ricahrd J. Koerner, La Jolla, Calif.
[73] Assignee: The United States of America as represented by the United States Atomic Energy Commission, Washington, D.C.
[22] Filed: Mar. 5, 1970
[21] Appl. No.: 16,645

[52] U.S. Cl. .................52/224, 52/245, 220/55, 176/60
[51] Int. Cl. ..........................E04c 1/06, A47j 27/08
[58] Field of Search ...............52/223–230, 245; 138/89; 220/55 A, 55 B, 55; 176/60, 67, 85, 63

[56] References Cited
UNITED STATES PATENTS
2,133,934  10/1938  Ericsson et al. .................138/89
3,501,881   3/1970  Van Buren .......................52/223
3,404,497  10/1968  Burrow...........................52/224

FOREIGN PATENTS OR APPLICATIONS
29,304    8/1962  Great Britain..........................52/21
527,562   7/1921  France ..................................52/21
7,225     5/1932  Australia...........................220/55 B
866,037   4/1961  Great Britain.........................176/60

Primary Examiner—Henry C. Sutherland
Assistant Examiner—James L. Ridgill, Jr.
Attorney—Roland A. Anderson

[57] ABSTRACT

A concrete pressure containment vessel for a nuclear reactor is described wherein an access opening therein is sealed by a closure member. A plurality of tendons extend generally parallel with the axis of the access opening and are distributed about the access opening and pass entirely through the main portion of the pressure vessel and also through the closure member. The tendons are placed under tension to secure and seal the closure member in place and to prestress the remainder of the pressure vessel.

5 Claims, 6 Drawing Figures

PATENTED MAY 22 1973

INVENTOR
RICHARD J. KOERNER

ATTYS.

INVENTOR
RICHARD J. KOERNER

Anderson, Luedeka, Fitch, Even & Tabin
ATTYS.

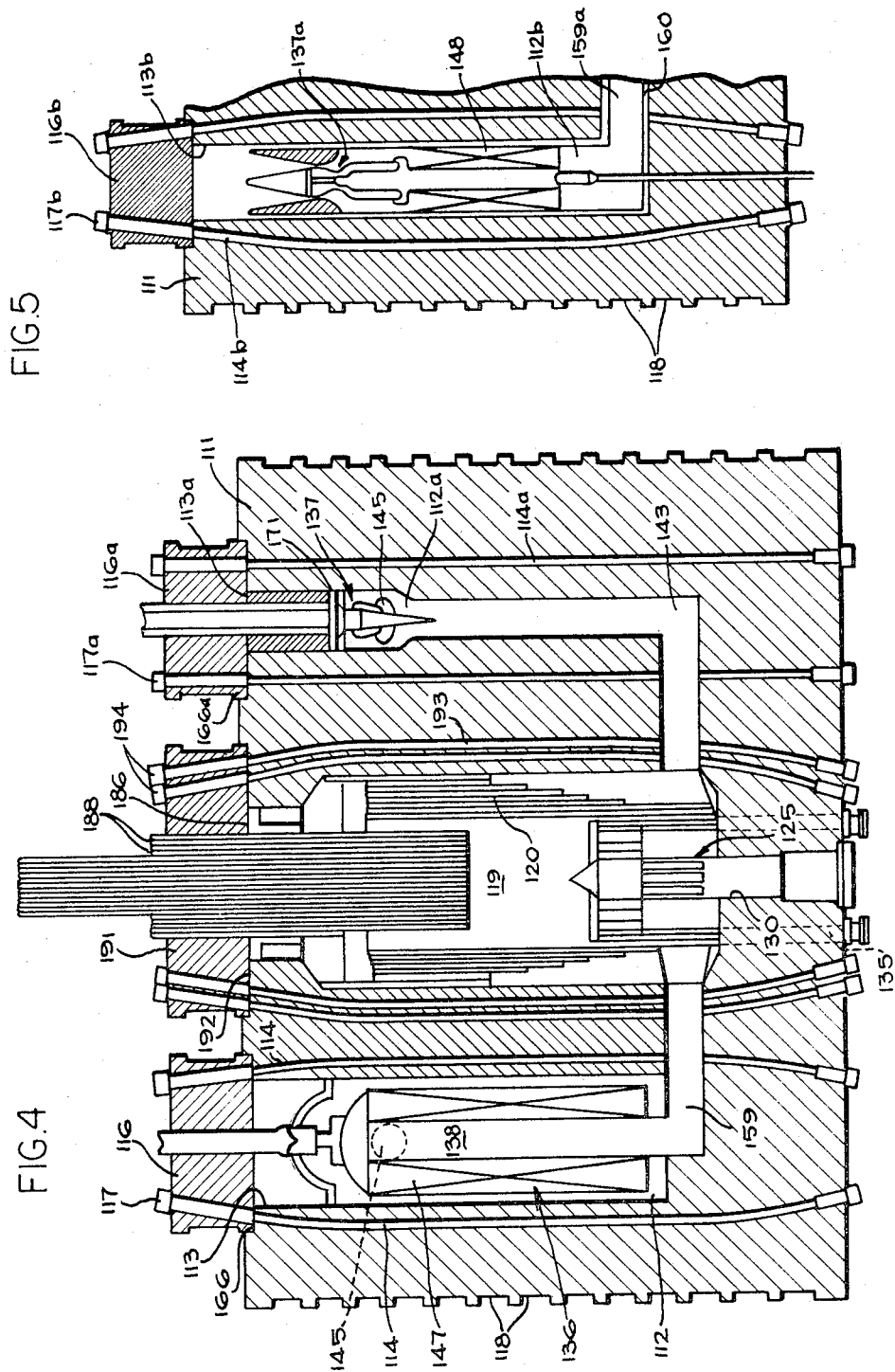

REACTOR VESSEL

This invention relates generally to concrete pressure containment vessels and, more particularly, to an improved prestressed concrete pressure containment vessel for a nuclear reactor system.

The use of a prestressed concrete reactor vessel for enclosing various elements of a nuclear reactor system, such as the reactor core, fluid circulating equipment, and steam generating equipment, is well known in the art. Among the advantages of this form of reactor construction are its relatively low cost and its non-susceptibility to sudden explosive failure. In addition, the use of a plurality of prestressing tendons or strengthening cables tends to mitigate against fault propagation in the reactor vessel since each tendon is independent of the others. Moreover, with the prestressing tendons embedded within the reactor vessel so that a portion of the vessel is between the tendons and the reactive core, the vessel thereby acts as a shield to avoid radiation embrittlement of the tendons. Prestressed concrete reactor vessels have also been found to be better adapted to erection in the field than thick metal containment vessels. This is because less dependence is required on the specialized skill and rigorous inspection associated with the welding of thick metal components.

Nuclear reactor systems are known wherein the entire primary system including the core, primary coolant circulators, steam generators, and associated main primary coolant ducting, is contained within a prestressed concrete reactor vessel. The fact that external main primary coolant ducts are eliminated by enclosing the entire primary system in the reactor vessel avoids the possibility of sudden loss of coolant due to ducting failure. Moreover, elaborate biological shielding in addition to the reactor vessel, for enclosing the steam generators and main primary coolant ducting (which may be necessary to deal with accidental primary circuit contamination) becomes unnecessary, since the reactor vessel itself performs this function.

Cooling of the reactor core is typically performed by means of a circulating fluid, which may thereafter be used to transfer heat to the steam generating equipment. The circulating fluid may be a gas which is chemically and nuclearly inert relative to the system, such as carbon dioxide or helium, or may be a liquid metal, such as liquid sodium, among others.

It is frequently desirable that certain of the internal elements of the nuclear reactor system be readily accessible for various reasons. For example, certain types of reactor malfunctions or accidents may require direct access to the reactor core for repair or replacement of various parts. In addition, it may be periodically necessary to effect repair and replacement of steam generating equipment or circulating equipment for the fluid coolant. Obviously, it is important that any penetration which permits access to the internal elements of the reactor system be adequately sealed and shielded during normal operation of the reactor. Moreover, it is important that any closure arrangement used for this purpose have sufficient integrity as to withstand high internal pressures resulting from accident situations. In designing the reactor vessel and the closure members therefor, a problem may be encountered in that the prestressing tendons of the prestressed concrete reactor vessel may interfere with access to the interior of the reactor vessel.

Accordingly, it is an object of the present invention to provide an improved prestressed concrete reactor vessel for a nuclear reactor.

Another object of the invention is to provide a prestressed concrete reactor vessel wherein ready access to the interior thereof is available while retaining high integrity in the vessel and the closure means utilized therein.

It is another object of the invention to provide a prestressed concrete reactor vessel of high integrity and including prestressing tendons, and wherein access to the interior of the reactor vessel is readily available.

Other objects of the invention will become apparent to those skilled in the art from the following description, taken in connection with the accompanying drawings wherein:

FIG. 4 is a sectional view taken along the line 4—4 of FIG. 3;

FIG. 5 is a sectional view taken along the line 5—5 of FIG. 3; and

Figure 1:
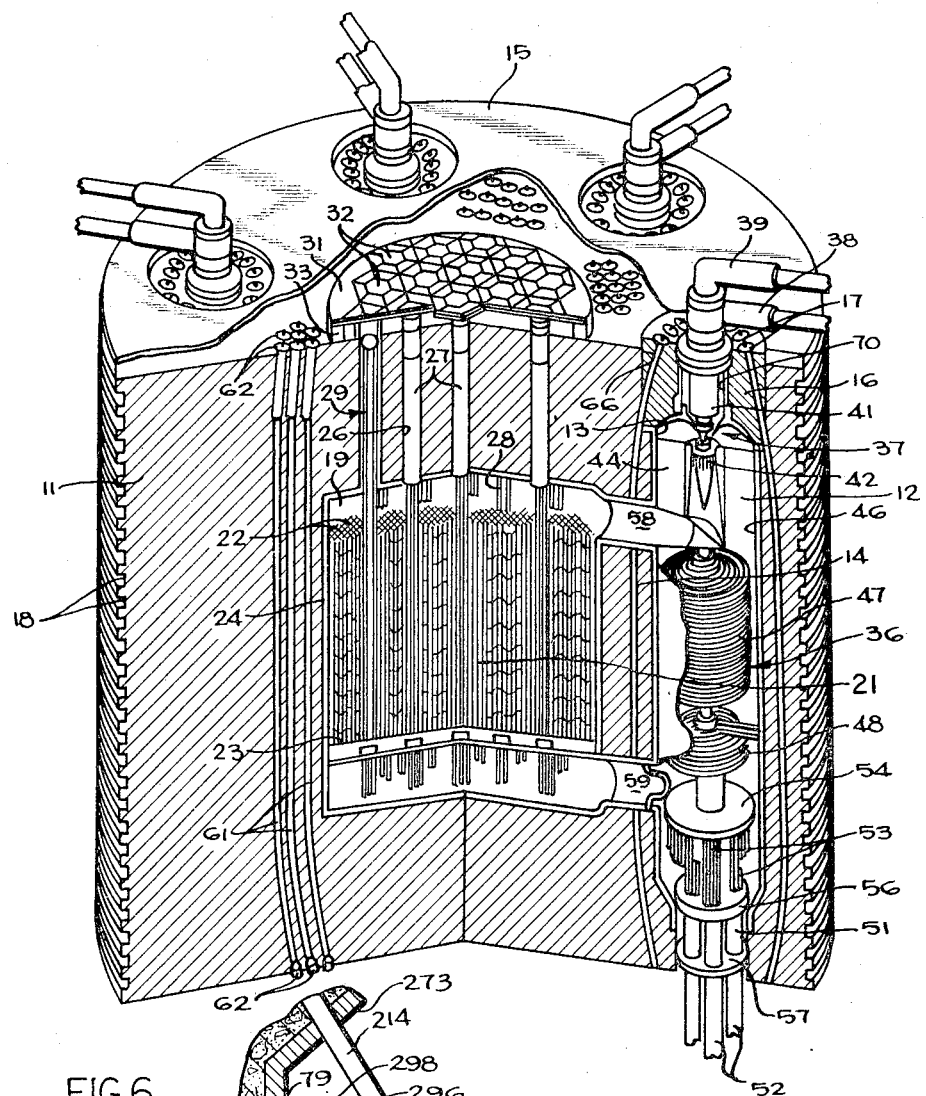
FIG. 1 is a perspective cut-away view of a nuclear reactor system utilizing a prestressed concrete reactor vessel constructed in accordance with the invention.

Very generally, the reactor vessel of the invention comprises a main concrete vessel portion 11 defining at least one internal chamber 12 and having at least one opening 13 communicating with the chamber. A plurality of tendons 14 are distributed about the chamber and the opening and pass completely through the main vessel portion within suitable ducts adjacent the chamber and the opening. A closure member 16 is positioned over the opening and engages the main vessel portion around the periphery of the opening. The plurality of reinforcing tendons pass through the closure member. Means 17 are provided for placing the tendons under tension to force the closure member against the main vessel portion to seal the opening. This places the closure member and the main vessel portion in compression along the tendons, thereby prestressing the main vessel portion.

Referring now more particularly to FIG. 1, the illustrated reactor system is for a high temperature reactor employing gas coolant, preferably helium. The concrete main vessel portion 11 of the reactor vessel is of generally cylindrical shape and is provided with a plurality of external circumferential channels 18 for accommodating circumferential bands, not shown, which prestress the vessel circumferentially. The vessel is supported in an upright position on a suitable foundation by a support structure, not illustrated.

A central cylindrical cavity 19 is provided within the main vessel portion 11 for accommodating the reactive core 21. The reactive core 21 is comprised of a plurality of hexagonal fuel element blocks 22 which are stacked in columns on a supporting floor 23 which extends transversely of the interior chamber 19 near the bottom thereof. The chamber 19 is provided with a liner 24 of suitable material and a plurality of penetrations 26 extend vertically downward through the top of the main vessel portion 11 to communicate with the chamber 19 above the core 21. Each of the penetrations 26 accommodates an elongated cylindrical housing 27 which contains a mechanism for operating control rods 28. The control rod operating mechanism is illustrated schematically at 29 in one of the penetrations 26 wherein the housing 27 is not shown. The mechanism 29 may be removed from the housing 27 so as to enable refuelling to take place through the associated penetrations 26 by suitable refuelling machines, not illustrated. Such refuelling machines raise and lower the hexagonal fuel blocks 22 to position them appropriately in the reactor core 21.

The upper ends of the housings 27 terminate in a generally circular plate 31 mounted on top of the main vessel portion 11 and in which are provided a plurality of wells 32 for accommodating the unillustrated refuelling mechanisms. The plate 31 is mounted on a surrounding annular wall 33 and thereby seals off the area directly above the access penetrations 26, forming a second or supplementary pressure barrier. A further plate 15 covers the top of the reactor vessel and is provided with appropriate circular openings above the various penetrations, including those described below.

The central chamber 19 for the reactive core 21 is surrounded by a plurality of smaller elongated cylindrical satellite chambers 12. The axes of the chambers 12, only one of which is visible in FIG. 1, are generally parallel with the axis of the cylindrical chamber 19, and the chambers 12 are distributed circumferentially around the central chamber 19. Each of the chambers 12 contains a steam generator 36 and a gas circulator 37. As will be explained in detail below, a portion of each of the gas circulators protrudes from the reactor containment vessel and includes inlet and outlet ducting 38 and 39, for conducting a driving fluid to a turbine section 41 of the circulator 37. Preferably, redundant driving systems for the turbines are provided to enhance reliability. As a result of this construction, no rotary elements such as shafts need protrude through the pressure containment vessel, thereby making the problem of sealing more simple. Each circulator 37 includes an impeller 42 for moving fluid coolant through an impeller duct 43. The fluid coolant is drawn into the impeller 42 and forced through the duct 43 from the annular space 44 which surrounds the duct between the duct and the lining 46 of the chamber 12.

Each of the steam generators 36 includes a main section 47 of suitably distributed helically wound coils forming an evaporator-economizer section and, if desired, a superheater section. In addition, a separate section 48 of helically wound coils or tubes is provided and may form a reheater section through which steam is circulated after driving the first several stages of a power generating turbine, not shown. Suitable headers 51 are provided for the various tube bundles to conduct the driving fluid (i.e. steam or water) from main inlet and outlet conduits 52 to individual feedlines arranged in bundles 53. Supporting discs 54, 56 and 57 are provided for the various main lines and headers and feedlines in the steam generator.

In order to conduct circulating fluid coolant from the outlet duct 43 of each of the circulators 37 to the space in the chamber 19 above the core 21, each of the ducts 43 is connected to such space by a radially extending duct 58. After passing over the fuel blocks in the core 21 through suitable passages, not shown, extending vertically through the core, the coolant is collected in the space in the chamber 19 beneath the core 21 and is directed to the space below each of the steam generators 36 through radially extending ducts 59. The heated fluid coolant passing through the ducts 59 moves up through the steam generators 36 and into the annular space 44 surrounding the ducts 43. During this process, heat is withdrawn from the circulating fluid coolant by the steam generators. The fluid coolant is then recirculated by the impellers 42 of the circulators 37 and is returned to the chamber 19 for another pass through the core.

In order to provide prestressing of the main vessel portion 11 along the axial length thereof, a plurality of axially extending tendons 61 are provided distributed at appropriate locations throughout the main vessel portion. Suitable tightening means 62, such as threaded nuts, are provided at the ends of the tendons 61 in order that they may be appropriately tightened in a manner described below for tendons 14 to provide the desired degree of prestressing. The tendons 61 extend completely through the main vessel portion and are distributed about the central chamber 19.

In addition to the tendons 61, the further axial prestressing tendons 14 are provided around each of the chambers 12. The tendons 14 are distributed in a circular array about each chamber 12 and the opening 13 therein. The tendons 14 pass completely through the main vessel portion 11 adjacent the chambers 12 and the openings 13, and are tightened by the means 17, as will be explained below, to provide prestressing in the region of the chambers 12.

In order to enable the steam generators 36 and the helium circulators 37 to be installed in the chambers 12, and in order to permit periodic repair and replacement of such equipment, the access openings 13 are provided in the main portion 11 of the reactor vessel. To ensure the integrity of the reactor vessel, the access openings 13 are closed off by the closure members 16. In the illustrated embodiment, each of the closure members 16 comprises a concrete plug which fits in a recess 66 in the main vessel portion 11 and directly above the opening 13 into the chamber 12. The recess 66 is of slightly larger diameter than the opening 13 and the chamber 12 for reasons which are explained below.

Figure 2:
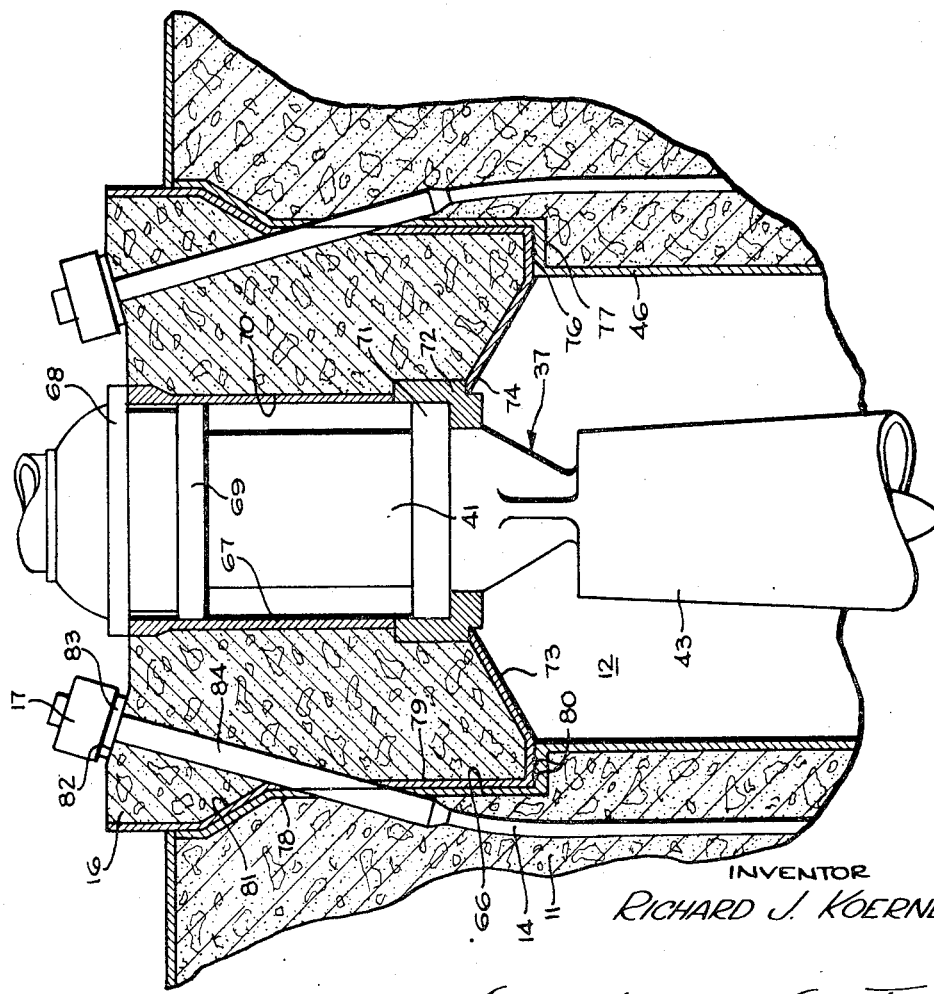
FIG. 2 is an enlarged full section elevational view of a portion of the reactor system of FIG. 1 illustrating, in particular, a closure member utilized therein.

Referring now more particularly to FIG. 2, the configuration of the closure member or plug 16 may be more readily perceived. Each of the plugs 16 is comprised of concrete and has an axial opening 70 centrally thereof having a generally cylindrical metallic liner 67 therein. The turbine portion 41 of the circulator 37 is disposed in the opening and is sealed therein by three annular sealing rims 68, 69 and 71. The rim 68 rests on the upper end of the liner 67, which is widened thereat. The rim 69 engages the liner 67 a slight distance below the rim 68. The rim 71 seats in a mounting ring 72 of L-shaped cross section at the bottom end of the central opening in the plug. The bottom surface of the plug is provided with a metallic liner 73. The liner 73 consists of a frustoconical section terminating at its upper end in an annular notch 74 in the mounting ring 72 and terminating at its lower end in a flat sealing ring portion 76. The liner 46 of the chamber 12 is provided with an annular flange 77 surrounding the opening 13 and upon which the flat ring portion 76 seats, thereby supporting the plug 16. The recess 66 includes a metal liner 78 and the outer surface of the plug 16 is provided with a metal liner 79. The recess 66 is bevelled in the region 81 and the plug 16 is correspondingly shaped to follow this contour.

The tendons 14 surrounding the chamber 12 and the opening 13 thereto pass completely through the plug 16 and emerge from an annular bevelled surface 82 in the top surface of the plug. The tendons 14 are angled slightly inward in this region of the plug 16 such that any tension exerted on the tendons is applied normal to the bevelled surface 82. The tendons 14 are tightened by the suitable tightening means 17 which may comprise threaded nuts or a similar arrangement. The tightening means 17 are separated from the bevelled surface 82 by means of washers 83. To apply tension to tendons 14, hydraulic jacks (not shown) are attached to the threaded nuts or tightening means 17 and actuated so as to press down against plugs 16 while at the same time pulling up on tendons 14. When the desired tension is obtained, some elongation of the tendons will have occurred and shims (not shown) are therefore inserted between tightening means 17 and washers 83 to retain the tendons in tension, thus permitting removal of the hydraulic jacks. To facilitate the passage of the tendons 14 through the plugs 16, tendon sheaths 84 are provided in the region of the plugs 16.

To effect sealing between the plug 16 and the main vessel portion 11, a seal is provided at the interface between the plug and the main vessel portion. Such a seal may take any suitable configuration. In the illustrated embodiment, sealing is effected by three concentric rings 80 which surround the opening 13 at the interface between the annular plate 76 and the annular flange 77. Preferably, a soft metal material should be utilized for the rings so that the metal will flow under pressure. The rings are then disposed in annular grooves to secure them in place and to confine the metal as it flows when the tendons are tightened. Where radiation is low enough in the seal region so as not to be a significant factor, a material such as neoprene may also be satisfactory.

When the tendons 14 are tightened, the plug 16 is held securely in place over the opening 13, sealing the chamber 12. A large number of steel tensile elements, not shown, such as reinforcing bars or prestressing wires, may be utilized in the plug to provide reinforcing or prestressing in other directions in addition to the axial prestressing provided by the tendons 14. To facilitate the passage of the tendon heads through the plugs 16 during plug removal, tendon ducts 84 of enlarged diameter are provided in the region of the plugs 16. The plug may be removed by detensioning the prestressing tendons provided for hold-down capability and allowing the tendon to slide down the tendon duct until the tendon head engages the restricted portion of the duct at the lower end of duct 84, thereby allowing removal of plug 16 and permitting access into the chamber 12. The hold-down capacity provided by the tensioning of the tendons 14 also forms a pressure seal around the base of the plug to prevent leakage of pressurized gas or fluid within the chamber 12.

Figure 3:
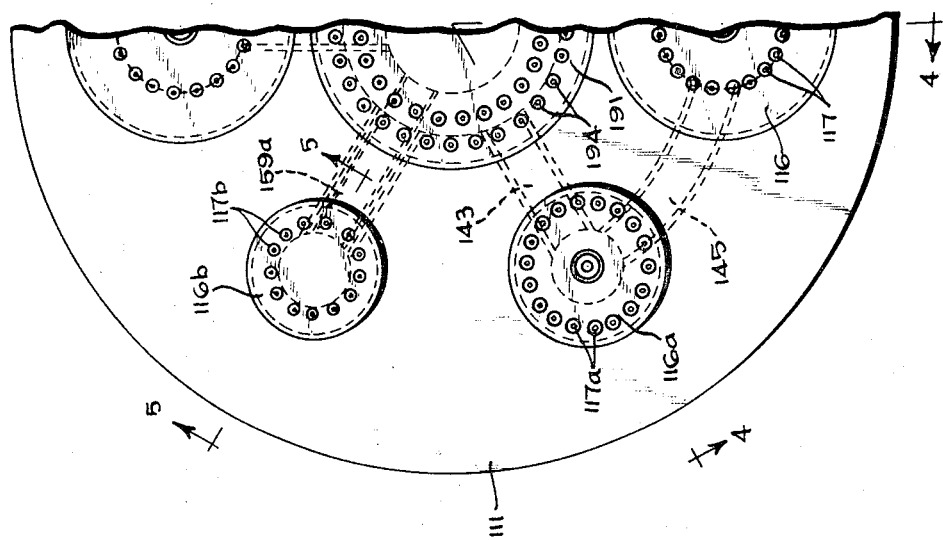
FIG. 3 is a half plan view illustrating an alternative embodiment of the invention.

Referring now to FIGS. 3 to 5, an alternative embodiment of the invention is illustrated. Parts of the embodiments of FIGS. 3 to 5 having a function similar to those of the embodiment of FIGS. 1 and 2 have been given identical reference numbers preceded by the numeral 1. The illustrated reactor system is also a gas cooled reactor in which the reactive core 121 is disposed in the central cylindrical cavity 119 of a concrete cylindrical reactor vessel 111. The particular illustrated design is contemplated for use with a fast reactor. A shield 120 is provided surrounding the core 121 for shielding in addition to the shielding provided by the concrete main vessel portion 111. A suitable fuel transfer machine 125 is provided near the bottom of the chamber 119 for loading and unloading fuel elements from the core 121. The fuel transfer machine extends into the chamber 119 through a port 130 in the bottom of the reactor vessel. Loading and unloading ports 135 are also provided in the bottom of the reactor vessel to enable the fuel transfer machine to pass fuel elements into and out of the chamber 119.

A plurality of satellite chambers are provided within the main vessel portion 111 distributed around the central chamber 119. Unlike the embodiment of FIGS. 1 and 2, there are three different types of satellite chambers, two of each type being provided. The chamber 112, unlike the chamber 12 in the previous embodiment, contains only a steam generator 136. The steam generator 136 includes a central coolant duct 138 surrounded by appropriately arranged tubing 147 to form the evaporator-economizer and superheater sections of the steam generator. Gas flow through the steam generator is upward through the central duct 138 and then down through the tubing 147. Coolant then circulates upwardly in the space between the steam generator 136 and the wall of the chamber 112, flowing into a duct 145. The duct 145 carries the coolant horizontally and circumferentially through the main vessel portion 111 to a further chamber 112a in which the main coolant circulator 137 is mounted. The coolant is then circulated by the main circulator 137 downwardly through a duct 143 into the space in the chamber 119 between the shield 120 and the wall of the chamber. The gas coolant then moves to the space in the chamber 119 above the core 121 where it circulates down through the core and is collected in the space at the bottom of the chamber 119 just above the handling machine 125.

After being collected in the space within the cylindrical shield 120 below the core 121, the coolant is redirected to the steam generator 136 through the radially extending duct 159. In addition to the duct 159, ducts 159a (see FIGS. 3 and 5) also extend from the same region to satellite chambers 112b. In the chambers 112b, a reheater 148 is provided together with an auxiliary circulator 137a. The duct 159a is constructed with concentric passages so that coolant may circulate to and from the chamber 112b. Coolant circulates upwardly in the chamber 112b through the reheater 148 and the auxiliary circulator 137a. From the top of the chamber, the coolant is returned down the outside of the circulator and heat exchanger between such elements and the chamber wall, and is returned to the space beneath the reactor core, around the outside of the duct 159a in the coaxial space 160 between the duct and the vessel 111.

An opening 186 is provided in the reactor vessel directly above the core 121. The fuel elements of the core 121 are suspended from a grid 187 which extends transversely of the chamber 119 near the top thereof. Support rods 188 for the fuel elements and blanket elements of the core extend through the opening 186 and project above the reactor pressure vessel in order that individual elements may be released from the grid and lowered by the rods into the loading and unloading machine 125.

In order to seal the opening 113 and thus seal the chamber 112, a closure member 116 consisting of a concrete plug is provided. The closure member 116 sits in an annular recess 166 provided in the top of the main vessel portion 111. As was the case in the previous embodiment, a suitable seal may be provided between the concrete plug 116 and the main vessel portion around the opening 113. As also was the case in the previous embodiment, a plurality of prestressing tendons 114 are provided. The tendons pass through the plug 116 and completely through the main vessel portion 111 adjacent the chamber 112 and the opening 113. The tendons are arrayed circularly about the opening and tightening means 117 are provided for placing the tendons under tension to force the plug 116 against the main vessel portion and seal the opening 113. Thus, the plug and the main vessel portion are placed in compression along the tendons.

Similarly, the chamber 112a is sealed by a plug 116a which seats in a recess 166a about the opening 113a of the chamber. Prestressing tendons 114a are used in a manner similar to the tendons 114 and are placed under tension by tightening means 117a. It may be noted, however, that the tendons 114a do not bow outwardly in the region of the plug 116a, since the relatively smaller diameter of the chamber 112a obviates this requirement.

The chamber 112b is provided with a closure plug 116b which is held down in a manner similar to that of the other plugs by prestressing tendons 114b tightened by tightening means 117b.

In addition to removable closure members for the satellite chambers 112, 112a and 112b, the central core chamber 119 is also provided with a removable closure member 191. The closure member 191 is provided with a plurality of penetrations therein to permit the support rods 188 to pass therethrough. The closure member 191 seats in an annular recess 192 surrounding the opening 186 into the chamber 119. A suitable seal (not shown) may be provided at the surface between the plug 191 and the main vessel portion 111 around the opening 186. A plurality of prestressing tendons 193 are provided distributed in concentric rows about the chamber 119 and the opening 186 thereto. The tendons pass completely through the main vessel portion and completely through the closure member or plug 191. Means 194 are provided for placing the tendons 193 under tension in order to provide prestressing and seal the closure member 191 against the main vessel portion 111. This places the closure member 191 and the main vessel portion in compression along the tendons.

Figure 6:
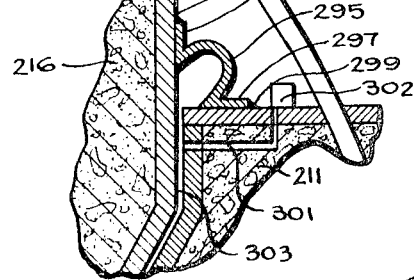
FIG. 6 is an enlarged fragmentary view of a portion of a reactor vessel illustrating a modification of the invention.

Referring now to FIG. 6, a modification of the invention is shown which provides additional pressure sealing between the closure member and the pressure vessel. Such an expedient may be useful where the sealing between the plug and the vessel provided by tensioning the tendons is insufficient. FIG. 6 is an enlarged fragmentary view of a region between a closure member 216 and a pressure vessel 211 at the upper surface of the pressure vessel.

The additional sealing is provided by an annular bellows 295 having a flange section 296 mating against the outer surface of the liner 279 of the plug 216 and having a further flange 297 mating against the top cladding 300 of the pressure vessel 211. Welds are provided at 298 and 299 in order to ensure the integrity of the sealing and to secure the bellows in place.

The bellows 295 is designed to resist the full internal pressure which could result form leakage past the compression seals between the plug and the pressure vessel. If desired, a passage 301 and a pressure sensing device 302 may be provided to measure the leakage past the compression seals into the region 303 between the compression seals and the bellows 295. The tendons 214 emerge from the pressure vessel 211 at its top surface and pass through the air before they enter the plug 216 at a bevelled surface 273 thereof. The bellows 295 is located between the tendons 214 and the plug at the top surface of the vessel to ensure that leakage will not occur through the portion of the tendon duct in the plug.

It may therefore be seen that the invention provides a pressure containment vessel wherein prestressing tendons are utilized as hold-down devices to secure closure members in position. This provides a pressure resisting construction which may be utilized over any of several cavities in a prestressed concrete pressure vessel. The construction provides structural redundancy equal to that of the pressure vessel itself, since it relies on a large number of tendons to provide the structural integrity. The redundancy of load resisting elements thus mitigates against total failure of the closure member resulting from the propagation of a local crack. The resulting redundancy provided by the invention is equal to the redundancy of each portion being connected (i.e. the reactor vessel and the closure plug). Thus, the redundancy of the entire system is equivalent to each of the component parts making the safety philosophy justification of the entire system no different from that philosophy justifying the use of a prestressed concrete reactor vessel over that of a conventional steel pressure vessel, as discussed previously. The closure members may be designed using a large number of steel tensile elements which may be reinforcing bars or prestressing wires. The closure members may be removed by detensioning the prestressing tendons provided for hold-down capability, and a very large access opening into the cavity or cavities of the vessel is thereby obtained. The invention also provides the means of forming a pressure seal around the base of the closure member to prevent leakage of pressurized fluid within the pressure vessel.

Although the closure members herein described are of concrete, closure members of other materials, such as steel, may be used in a similar arrangement. Although in such a situation it may not be important to prestress the closure member itself, the tendons prestress the main vessel portion and provide superior hold-down qualities for sealing the closure member over the opening.

Various modifications of the invention in addition to those shown and described herein will become apparent to those skilled in the art from the foregoing description and accompanying drawings. Such modifications are intended to fall within the scope of the appended claims.

What is claimed is:

1. A pressurized concrete reactor vessel comprising, a main vessel portion defining at least one internal chamber and having at least one opening communicating with said chamber, a plurality of tendons distributed about said chamber and said opening and passing completely through said main vessel portion adjacent said chamber and said opening, a closure member positioned over said opening and engaging said main vessel portion around the periphery of said opening, an annular seal disposed surrounding said opening between said closure member and said main vessel portion, said plurality of reinforcing tendons passing through said closure member, and means for placing said tendons under tension to force said closure member toward said main vessel portion to seal said opening, thereby placing said closure member and said main vessel portion in compression along said tendons.

2. A reactor vessel according to claim 1 wherein said main vessel portion is generally cylindrical, and wherein means are provided for prestressing said reactor vessel with a further plurality of circumferential prestressing tendons.

3. A reactor vessel according to claim 1 wherein said opening is circular, wherein said plug is of circular cross section, and wherein said tendons are arrayed circularly around the periphery of said plug extending approximately parallel with the axes of said plug and said opening.

4. A reactor vessel according to claim 1 wherein said seal comprises a plurality of concentric rings of a material capable of deforming when said tendons are tightened.

5. A reactor vessel according to claim 1 wherein said chamber is for containing means for operating on a fluid, and wherein said closure member includes an opening therein for passing fluid therethrough.

* * * * *